(No Model.)
T. H. WHITLOCK & C. L. ETHERIDGE.
COMBINED PLOW AND HARROW
No. 425,845. Patented Apr. 15, 1890.
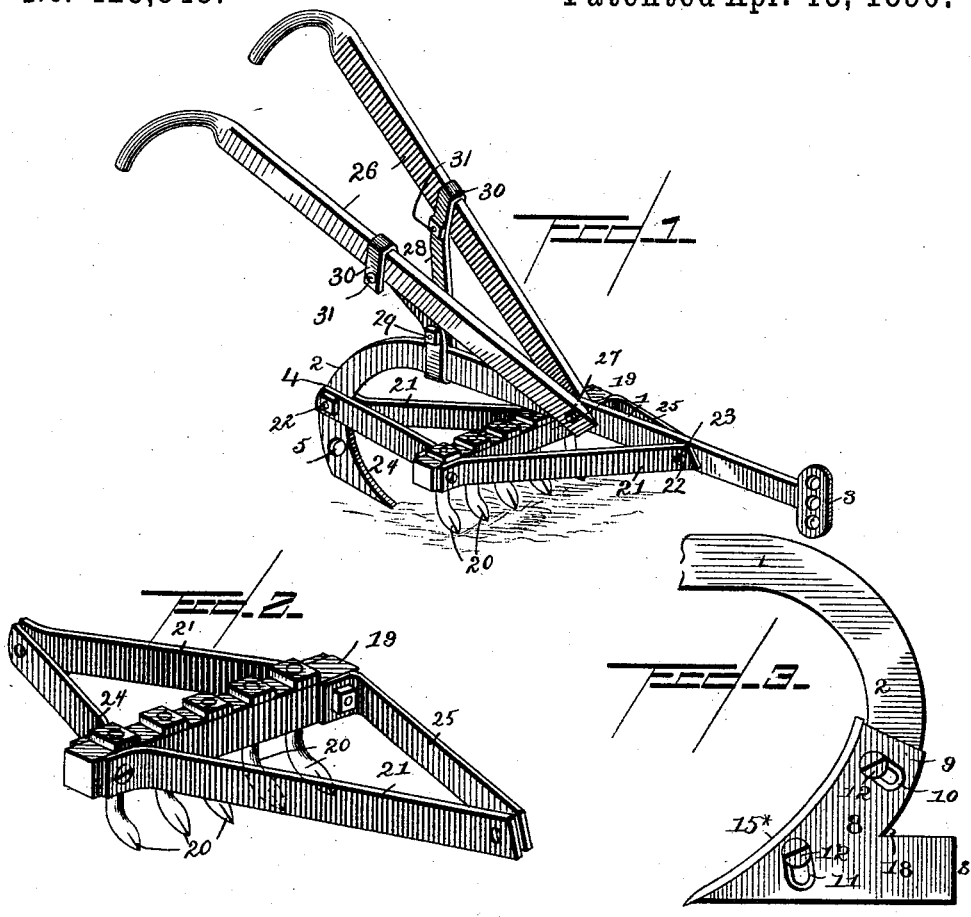
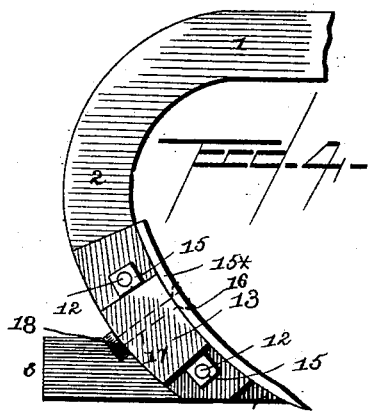
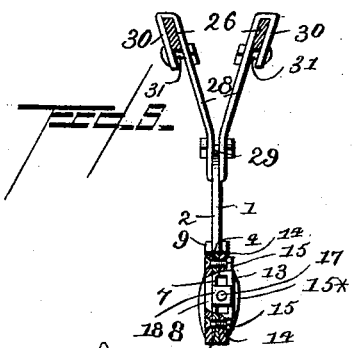

UNITED STATES PATENT OFFICE.

THOMAS HARDEN WHITLOCK AND CARROLL LAFAYETTE ETHERIDGE, OF PARIS, TENNESSEE.

COMBINED PLOW AND HARROW.

SPECIFICATION forming part of Letters Patent No. 425,845, dated April 15, 1890.

Application filed September 2, 1889. Serial No. 322,728. (No model.)

*To all whom it may concern:*

Be it known that we, THOMAS HARDEN WHITLOCK and CARROLL LAFAYETTE ETHERIDGE, citizens of the United States, residing at Paris, in the county of Henry and State of Tennessee, have invented a new and useful Improvement in a Combined Plow and Harrow, of which the following is a specification.

Our invention relates to combined plows and harrows or cultivators; and our improvement consists in the improved construction and arrangement or combination of parts, hereinafter fully disclosed in the description, drawings, and claims.

Our improvement is particularly directed to a novel construction of cultivator attachment for a plow-beam, whereby such attachment may be readily and quickly applied to the ordinary curved-standard plow-beam. This attachment consists of a bar having cultivator-teeth and two long braces secured to the opposite ends of said bar, one extending to the front and the other extending to the rear of said bar, and two short beams secured to the opposite ends of said bar, one extending to the front and the other extending to the rear of said bar, whereby the toothed bar is carried beneath the plow-beam free of it, and is connected to it only by the braces, so that it is supported in diagonal relation to the beam by means of the two long and the two short braces. In this construction the end of one long brace and the end of one short brace are secured to the curved standard of the beam and the ends of the other long and short braces are secured to the beam in front of the toothed bar. These braces carry the toothed bar low down and hold it firmly, and they stand in pairs, so as to form a parallelogram frame with the toothed bar crossing the middle of the length and secured to the contiguous ends of the said long and short braces, so that the center line of the parallelogram will be coincident with the line of the beam.

It is important to notice that when the cultivator attachment is used the curved beam-standard extends down to about a level with the lower ends of the cultivator-teeth and works in the ground as a tooth, and serves as a guide to the beam and a support upon which the beam may be raised upon its heel to free the cultivator-teeth of any obstruction or rubbish which may gather in front of it.

These objects are attained in the combined plow and harrow or cultivator illustrated in the accompanying drawings, forming part of this specification, in which the same reference-numerals indicate the same parts, and in which—

Figure 1 represents a perspective view of our improved combined plow and harrow or cultivator, showing it with the harrow or cultivator attachment in place; Fig. 2, a perspective view of the detached harrow or cultivator attachment; Fig. 3, a side view of the plow-standard and plow; Fig. 4, a view of the opposite side, and Fig. 5 a rear view of the plow and handles.

In the drawings, the numeral 1 indicates the plow-beam, which has its rear end curved downward to form the standard 2, and which is formed with the usual clevis 3 or other well-known means for the attachment of the team at its forward end. The standard 2 is formed with an upper bolt-hole 4 and a lower bolt-hole 5 near its pointed lower end 6, and with a shallow recess 7 between said holes.

The landside 8 of the plow has its forward edge curved to correspond in shape to the curve of the standard, and is formed with an upwardly-extending portion 9, which has two transverse countersunk slots 10 and 11, which register with the bolt-holes 4 and 5 in the standard. Two bolts 12 have their heads fitting to slide in said slots and to be flush with the outer side of the landside, and said bolts are inserted through said slots and through the bolt-holes in the standard, the landside fitting snugly against the side of said standard. A bent bar or shackle 13 has two bolt-holes in its ends which register with the bolt-holes in the standard, and is bent to form a central slot between it and the standard. Two nuts 15 fit upon the ends of the bolts 12 and bear against the ends of the shackle, serving to clamp said shackle and landside, respectively, against the sides of the standard.

The plowshare $15^\times$, blade, shovel, or moldboard, as the case may be, has a countersunk bolt-hole 16, and a headed screw-bolt 17 is inserted through said bolt-hole and through the slot formed between the shackle and standard, and has a nut 18 upon its end, by means of which the share or shovel may be adjusted against the front edges of said standard, landside, and shackle, and may be set to penetrate more or less into the ground by being lowered or raised, as may be desired.

The landside may be tilted by sliding it with its transverse slots upon the bolts 12 and adjusting it by the nuts, so as to place its sole or lower edge at different angles to the standard, whereby the depth of the furrow cut by the plow may be regulated. A share, a cultivator shovel or blade, or a mold-board and point may be used and secured in the vertical slot formed between the standard and the shackle, according to the labor to be performed by the plow.

A beam 19, having cultivator or harrow-teeth 20, is obliquely secured below the beam and in front of the standard by means of two longer bars 21, secured, respectively, with their forward and rear ends to the opposite ends of said beam and with their rear and forward ends by means of nutted bolts 22 to the plow-standard in the bolt-hole 4, and in a bolt-hole 23 in the forward portion of the beam. A short bar 24 is secured to the forward bolt 22 and to the forward end of the beam 19, and a short bar 25 is secured to the rear bolt 22 and to the rear end of the beam 19. Said longer bars 21 and shorter bars 24 and 25 are respectively of the same length, so that they form a parallelogram, having the cultivator or harrow beam for the shorter diagonal and the plow-beam for the longer diagonal.

The handles 26 are secured to the beam by a bolt 27, and are supported in their rearwardly-inclined position by a V-shaped brace 28, having its doubled lower end secured around the beam and clamped thereupon by a bolt 29 above the same. The upper ends of said brace are bent over the handles to form hooks 30, which clamp and hold the handles by means of bolts 31, inserted through them below the handles.

When the plow is used alone, the cultivator or harrow beam, with its oblique brace-bars 21, 24, and 25, is removed, and the plow is removed when the cultivator or harrow beam is used.

The handles may be adjusted at various inclinations by moving the brace 28 upon the beam and handles, moving said brace forward for raising the handles, and vice versa.

Having thus fully described the construction and combination or arrangement of the several parts of our improved combined plow and cultivator or harrow, what we claim as new is—

1. The combination, with the plow-beam having a curved plow-standard, of a cultivator attachment, consisting of the toothed bar and the long and the short braces connected to the ends thereof in parallel pairs for attachment to the plow-beam and to support the toothed bar beneath the beam in the relation thereto, as shown and described.

2. The herein-described cultivator attachment, consisting of the toothed bar, the long braces attached to the ends and extending from the opposite sides thereof, and the short braces attached to the ends of the said bar and extending from the opposite sides thereof, the said braces forming a parallelogram frame, with their extended ends in line with the longitudinal center line of said frame for attachment to a plow-beam, in the manner shown and described.

In testimony whereof we have hereunto set our hands in the presence of two subscribing witnesses.

THOMAS HARDEN WHITLOCK.
CARROLL LAFAYETTE ETHERIDGE.

Witnesses:
C. S. DALY,
A. B. MITCHENER.